Oct. 7, 1947.   N. H. ROY   2,428,433
STRAIN MEASURING APPARATUS
Filed Nov. 17, 1943
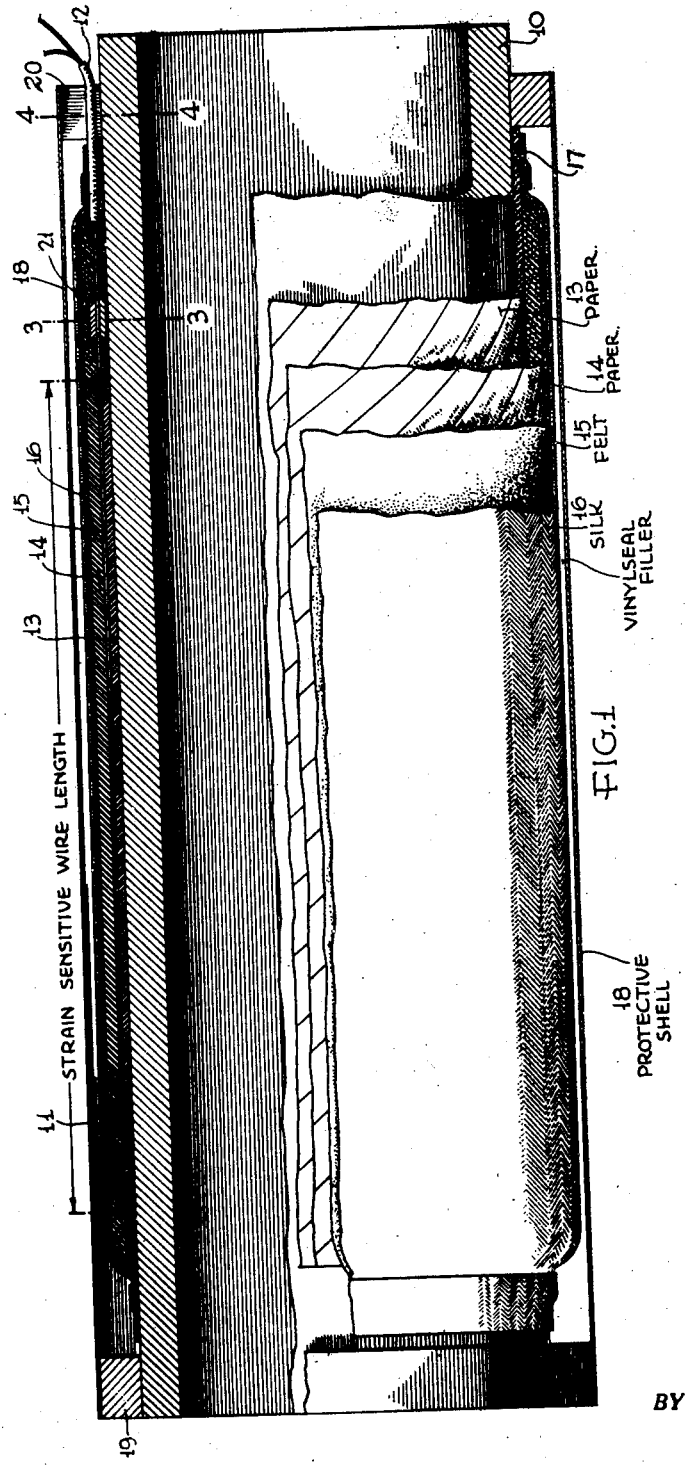
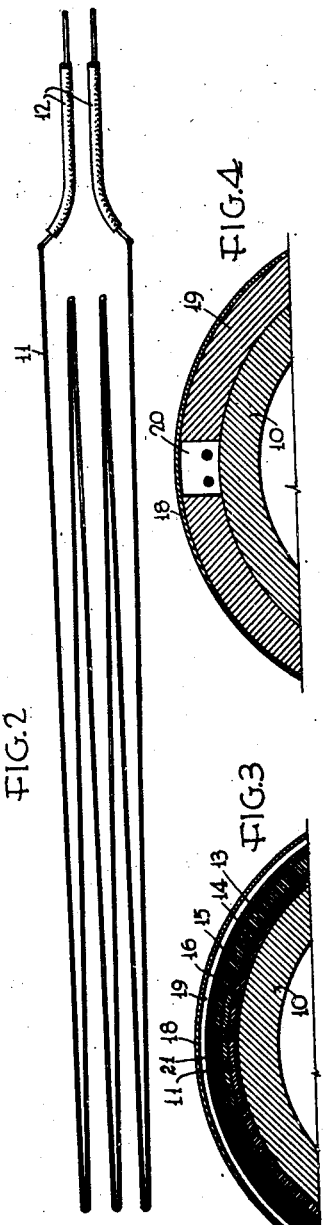
INVENTOR
Nereus L. Roy
BY John P. Tarbox
ATTORNEY Patented Oct. 7, 1947

2,428,433

UNITED STATES PATENT OFFICE 2,428,433

STRAIN MEASURING APPARATUS

Nereus H. Roy, Glenbrook, Conn., assignor, by mesne assignments, to Waugh Equipment Company, New York, N. Y., a corporation of Maine Application November 17, 1943, Serial No. 510,593

5 Claims. (Cl. 201—63)

This invention relates to strain measuring apparatus, and has for an object the provision of improvements in this art.

For measuring strains in a stressed member it is a known method to secure to it elements which by their movement along the direction of stress indicate the change in length of the member and thereby indicate the strain. Certain known types of electrical resistance wire change their resistance in a regular manner with change in length. Lengths of such wire are secured to the test member, as by adhesive, so as to change in length with the member. But if the adhesive is too soft the bond is insecure; and if it is too hard it will crack when strained and fail in its intended purpose.

According to the present invention, the adhesive is permitted to reach its optimum stage of cure and is then sealed to avoid all further cure over an indefinite period of time.

One of the particular objects of the invention, therefore, is to provide a joint or connection of a permanent and unchangeable character between the test member and the strain indicating element.

Another object is to provide an improved method of making such a joint.

Another object is to provide a sealed joint of a simple and inexpensive construction.

The above and other objects will be evident from the following description of an exemplary embodiment of the invention, reference being made to the accompanying drawings thereof, wherein:

Fig. 1 is a section and elevation along the axis of a test rod and strain indicating element showing a sealing joint formed according to the present invention:

Fig. 2 is a plan view of a strain indicating element alone;

Fig. 3 is a partial transverse section along the line 3—3 of Fig. 1; and

Fig. 4 is a partial transverse section along the line 4—4 of Fig. 1.

The test specimen 10 is illustrated by way of example as a tubular rod, it may be the push-pull rod of airplane wing flaps, a wheel strut, or any other member whose strain it is desired to measure.

To the rod 10 a longitudinal strain sensitive or strain indicating element 11, such as a special resistance wire, is bonded as by suitable adhesive. There are a number of known types of resistance wire whose resistance changes with change in length, such for example as "Advance," "Ni-chrome," "Isolastic," and the like, and the one selected will be that having characteristics best suited for the particular purpose. One consideration may be that the strain measuring element have a coefficient of temperature expansion similar to that of the test specimen. One suitable adhesive is known as "Duco" but there are a number of others. The strain indicating element 11, usually a small filament or wire, may include several adjacent lengths arranged in series with electrical conducting leads 12 connected with a source of current and amplifying and indicating devices.

The strain indicating or strain sensitive element 11 is electrically insulated from the test specimen 10 and from outside contact by suitable insulation, such for example, as a lower layer of paper 13 and a covering layer of paper 14, both secured by the selected adhesive. The paper layers are longer than the strain sensitive element and cover part of the insulation of leads 12.

A layer of felt 15 is loosely applied over the outer layer of paper 14 as thermal insulation to prevent local changes of temperature in the strain sensitive element and to insure a uniform temperature over the section of the test member to which it is applied.

At this stage, with the layers of paper and strain sensitive element bonded by adhesive to the test specimen the adhesive is allowed to dry or cure until the desired stage of adhesion between the strain sensitive element and the test specimen is secured. This permits required relative movement but the adhesive is well below the brittle point.

After drying or curing of the adhesive, a layer of impervious material 16, such for example as oiled silk, is secured over the felt layer. The edges of the impervious jacket 16 are secured and sealed by rubber tape 17 or other moisture resistant material. Over the whole joint, including end anchor blocks 19 and 20, a water and oil proof sealing compound, such as "Vinylseal" or the equivalent, is applied. A protective shell, preferably of metal, is secured to the test member to protect the strain measuring installation from mechanical damage such as from flying stones, mud, ice, and dust. A water and oil proof sealing compound is applied to the protective shell to effectively seal it against the entry of oil, water or dust. The end or ends of the strain sensitive elements are secured by anchor blocks 21.

When the adhesive bonded strain sensitive element is thus bonded to the test specimen it will remain in uniform operating condition for a great length of time, the adhesive remaining in its optimum condition without hardening or other objectionable alteration.

Specific reference has been made to electrical resistance strain elements as one use of the invention; but there may be other uses, as for example, for the bonding of mechanical strain gages to test members, for the bonding of accessory plates which are to carry mechanical strain gages, and for other uses—in brief, wherever it is necessary to use an elastic bonding medium and to prevent drying out to the point where brittleness causes a change in the gage length between accessory plates.

While one embodiment of the invention has been described for purposes of illustration it is to be understood that the invention may have various embodiments within the limits of the prior art and the scope of the subjoined claims.

What is claimed is:

1. In strain measuring apparatus in combination, a test member, a strain sensitive element mounted on said test member and insulated therefrom, securing means for securing the element to the test member including adhesive hardened to the optimum point, and means enclosing said element and said securing means to effectively seal it against air and moisture, said enclosing means including an oil silk jacket secured at the edges by rubber tape, a protective shell thereover, and a water and oil repellent filling compound in said shell.

2. In strain measuring apparatus in combination, a test member, a covering of paper secured by adhesive thereon, a strain sensitive electrical conducting resistance wire secured over said paper covering and aligned with the stress direction of said member, a second covering of paper secured by adhesive over said element, a heat insulating covering such as felt over said second paper covering, a moisture impervious sheath such as oil silk sealed over said felt covering, rubber bands sealing the ends of said silk sheath, a protective shell such as metal over the whole, and an oil and water proof sealing compound such as "Vinylseal" filling said shell.

3. In a strain measuring apparatus, the combination of a test member, an inner layer of insulation mounted on the test member, a strain sensitive element lying against the outer surface of the layer, an outer layer of insulation overlying the element, the layers being secured to one another and to the element and the inner layer being secured to the test member by an adhesive, which is capable of further increasing in hardness as a result of atmospheric action, and a sheath of material impervious to oil and moisture sealed to the test member and wholly enclosing the layers of insulation and the element.

4. In a strain measuring apparatus, the combination of a test member, an inner layer of insulation mounted on the test member, a strain sensitive element lying against the outer surface of the layer, an outer layer of insulation overlying the element, the layers being secured to one another and to the element and the inner layer being secured to the test member by an adhesive, which is capable of further increasing in hardness as a result of atmospheric action, a sheath of flexible material impervious to oil and moisture sealed to the test member and wholly enclosing the layers of insulation and the element, and a thin layer of a water-proof and oil-proof sealing compound enclosing the sheath, the sheath, layer of sealing compound, and test member forming a tight enclosure for the strain sensitive element.

5. In a strain measuring apparatus, the combination of a test member, an inner layer of fibrous electrical insulation mounted on the test member, a strain sensitive element lying against the outer surface of the layer, an outer layer of fibrous electrical insulation overlying the element, the layers being secured to one another and to the element and the inner layer being secured to the test member by an adhesive, which is capable of further increasing in hardness as a result of atmospheric action, a layer of thermal insulating material overlying the layers of electrical insulation and element, a sheath of flexible material impervious to oil and moisture overlying the layers and element and sealed to the test member to form an enclosure for the layers and element, and a thin layer of water-proof and oil-proof sealing compound enclosing the sheath.

NEREUS H. ROY.

REFERENCES CITED

The following references are of record in the file of this patent:

UNITED STATES PATENTS

| Number | Name | Date |
|---|---|---|
| 2,373,676 | Germeshausen | Apr. 17, 1945 |
| 2,252,464 | Kearns, Jr., et al. | Aug. 12, 1941 |
| 2,363,181 | Howland | Nov. 21, 1944 |
| 2,340,146 | Ruge | Jan. 25, 1944 |
| 2,350,073 | Simmons, Jr. | May 20, 1944 |
| 2,344,648 | Simmons, Jr. | Mar. 21, 1944 |